(12) United States Patent
Borthakur et al.

(10) Patent No.: US 9,215,361 B2
(45) Date of Patent: Dec. 15, 2015

(54) ARRAY CAMERAS WITH LIGHT BARRIERS

(71) Applicant: Semiconductor Components Industries, LLC, Phoenix, AZ (US)

(72) Inventors: Swarnal Borthakur, Boise, ID (US); Scott Churchwell, Meridian, ID (US); Rick Lake, Meridian, ID (US); Nathan Lee, Boise, ID (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 14/464,630

(22) Filed: Aug. 20, 2014

(65) Prior Publication Data

US 2015/0054993 A1 Feb. 26, 2015

Related U.S. Application Data

(60) Provisional application No. 61/869,354, filed on Aug. 23, 2013.

(51) Int. Cl.
*H04N 5/225* (2006.01)
*H04N 5/228* (2006.01)

(52) U.S. Cl.
CPC ........... *H04N 5/2258* (2013.01); *H04N 5/2257* (2013.01)

(58) Field of Classification Search
CPC ...... H04N 5/2258; H04N 5/225; H04N 5/228
USPC .................................................. 348/294, 308
See application file for complete search history.

(56) References Cited

U.S. PATENT DOCUMENTS

| 7,812,869 | B2 | 10/2010 | Boettiger | |
|---|---|---|---|---|
| 2008/0165257 | A1 | 7/2008 | Boettiger | |
| 2011/0031381 | A1* | 2/2011 | Tay | H01L 27/14625 250/226 |
| 2013/0003184 | A1 | 1/2013 | Duparre | |
| 2015/0035001 | A1* | 2/2015 | Yamazaki | H01L 51/5253 257/100 |
| 2015/0062420 | A1* | 3/2015 | Borthakur | H04N 5/2253 348/373 |

\* cited by examiner

*Primary Examiner* — Tuan Ho
(74) *Attorney, Agent, or Firm* — Treyz Law Group, P.C.; Kendall P. Woodruff

(57) ABSTRACT

An imaging system such as an array camera may include an array of image sensors. The image sensors may each include an array of image pixels formed in a common image sensor substrate. A protective glass cover layer may be provided over the array of image sensors. The cover layer may be attached to the image sensor substrate using an adhesive. The adhesive may be formed on the image sensor substrate in a grid-like pattern in between adjacent image sensors in the array. A light blocking material may be formed on the adhesive grid to minimize optical crosstalk between neighboring image sensors. The light blocking material may fill or partially fill a trench in the adhesive, may coat the outer surfaces of the adhesive, and/or may coat the inner surfaces of the adhesive. If desired, light barriers may also be formed in openings in the glass cover layer.

20 Claims, 6 Drawing Sheets

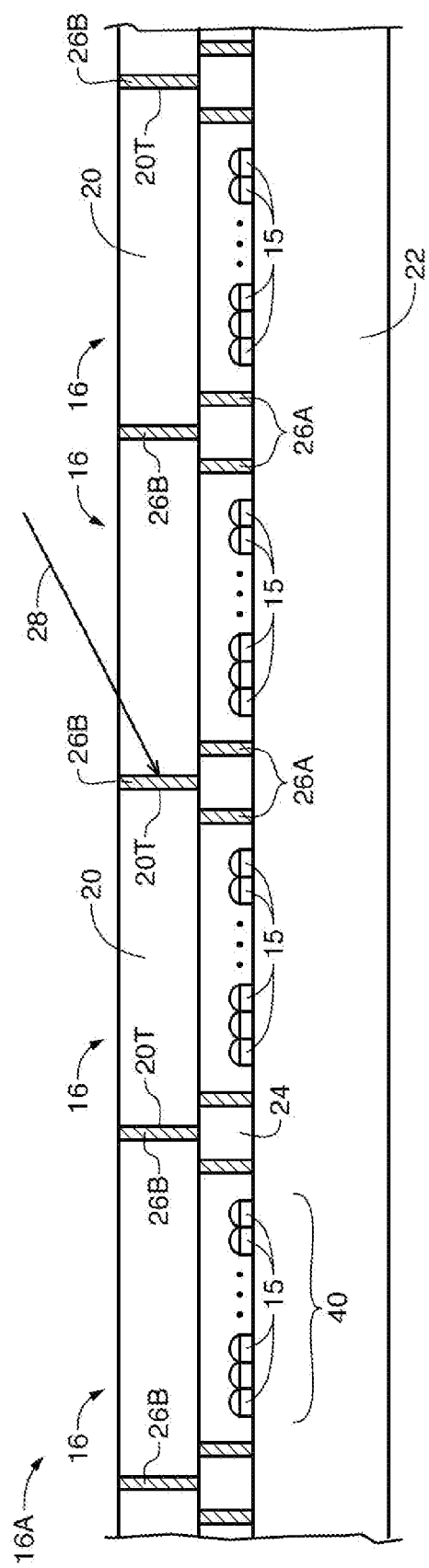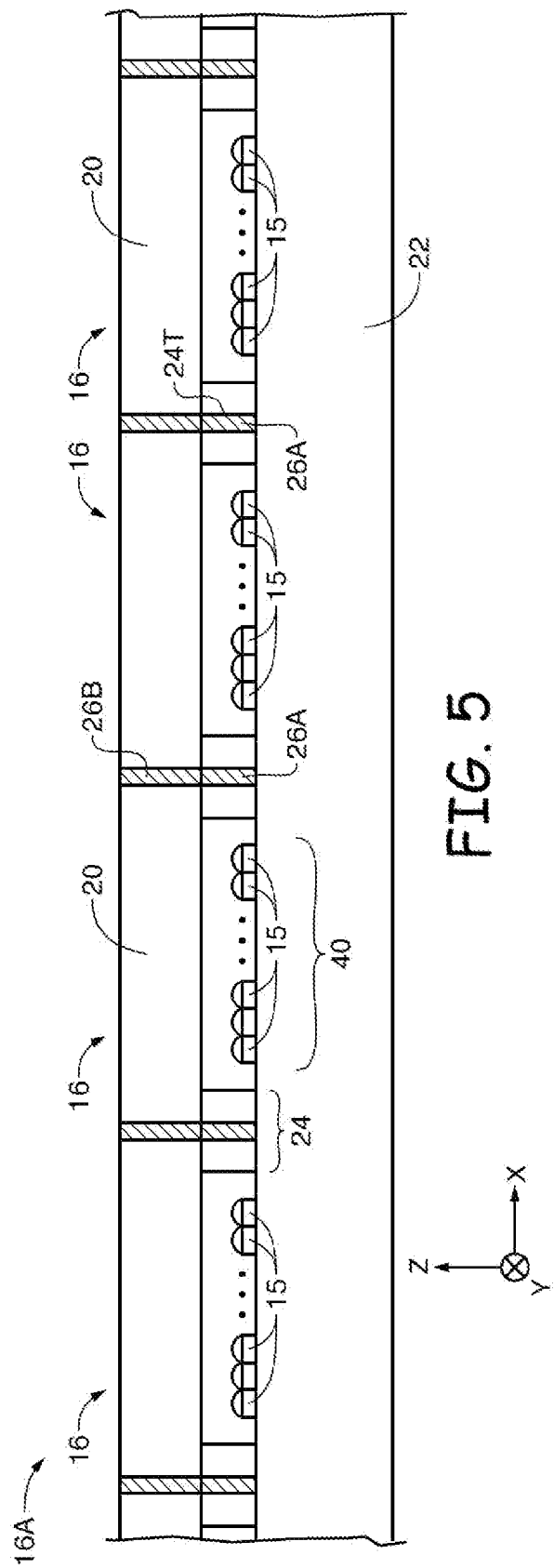
FIG. 4
FIG. 5

ARRAY CAMERAS WITH LIGHT BARRIERS

This application claims the benefit of provisional patent application No. 61/869,354, filed Aug. 23, 2013, which is hereby incorporated by reference herein in its entirety.

BACKGROUND

This relates generally to imaging systems and, more particularly, to imaging systems with arrays of image sensors.

Modern electronic devices such as cellular telephones, cameras, and computers often use digital image sensors. Imagers (i.e., image sensors) often include a two-dimensional array of image sensing pixels. Each pixel typically includes a photosensitive element such as a photodiode that receives incident photons (light) and converts the photons into electrical signals.

In a typical arrangement, an electronic device is provided with a single image sensor having a single pixel array and a single corresponding lens. Some electronic devices use an array of image sensors and a corresponding array of lenses to gather image data. This type of system, which is sometimes referred to as an array camera, may be used to extend depth of focus, increase output resolution through super-resolution processing, and capture depth information from a scene. Array cameras typically include an array of image sensors arranged laterally adjacent to one another. A protective cover glass is provided over the array of image sensors and attached to the array using an adhesive.

If care is not taken, unwanted light reflections and optical crosstalk can occur in an array camera having an array of image sensors. For example, light with high angles of incidence can pass through a portion of the glass that covers one image sensor and strike the image pixels of an adjacent image sensor. Light may also be reflected within the array camera (e.g., by metal elements or other surfaces in an image sensor) and may pass through the adhesive between two adjacent image sensors in the array. This type of optical crosstalk can negatively affect system performance.

It would therefore be desirable to be able to provide improved arrangements for array cameras having multiple arrays of imaging pixels.

BRIEF DESCRIPTION OF THE DRAWINGS

FIG. 4 is a cross-sectional side view of an illustrative array of image sensors having a semiconductor substrate and a cover layer attached using adhesive, where the outer surfaces of the adhesive are coated with a light blocking material and where the cover layer has openings filled with a light blocking material in accordance with an embodiment of the present invention.

FIG. 5 is a cross-sectional side view of an illustrative array of image sensors having a semiconductor substrate and a cover layer attached using adhesive, where the adhesive and the cover layer both have trenches that are filled with a light blocking material in accordance with an embodiment of the present invention.

DETAILED DESCRIPTION

Electronic devices such as digital cameras, computers, cellular telephones, and other electronic devices include image sensors that gather incoming image light to capture an image. An image sensor may include an array of imaging pixels. The imaging pixels may include photosensitive elements such as photodiodes that convert the incoming image light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the imaging pixels and readout circuitry for reading out image signals corresponding to the electric charge generated by the photosensitive elements.

Figure 1:
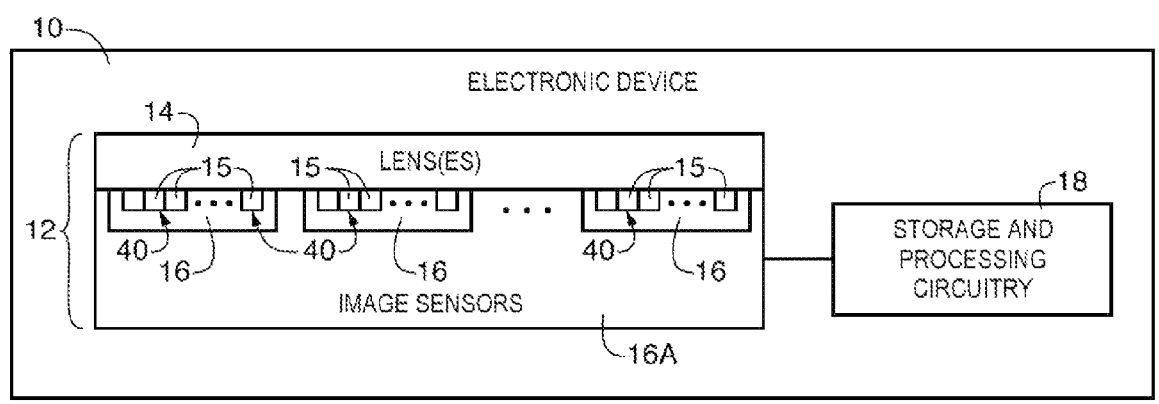
FIG. 1 is a diagram of an illustrative imaging system having a camera module with an array of image sensors in accordance with an embodiment of the present invention.

FIG. 1 is a diagram of an illustrative electronic device that uses one or more image sensors to capture images. Electronic device 10 of FIG. 1 may be a portable electronic device such as a camera, a cellular telephone, a video camera, or other imaging device that captures digital image data. Electronic device 10 may include a camera module such as camera module 12 for converting incoming light into digital image data.

Camera module 12 may include an image sensor array such as image sensor array 16A having an array of image sensors 16. One or more lenses such as lenses 14 may be used to focus incoming light onto image sensors 16. If desired, a single lens 14 may cover the entire array 16A of image sensors 16 or each image sensors 16 may be covered by a respective lens 14. Each image sensor 16 may include an image pixel array 40 with an array of image sensor pixels 15. Each image sensor 16 may include a protective transparent cover layer formed over the array of image sensor pixels 15. The transparent cover layer may be interposed between pixel arrays 40 and lenses 14. Image sensors 16 may include one or more backside illumination (BSI) image sensors and/or one or more front side illumination (FSI) image sensors.

There may be any suitable number of lenses in lens array 14 and any suitable number of image sensors in image sensor array 16A. Lens array 14 may, as an example, include N*M individual lenses arranged in an N×M one-dimensional or two-dimensional array. The values of N and M may be one, two, three, greater than three, greater than 10, etc. Image sensor array 16A may contain a corresponding N×M one-dimensional or two-dimensional array of image sensors 16. The image sensors may be formed on one or more separate semiconductor substrates. With one suitable arrangement, which is sometimes described herein as an example, the image sensors are formed on one common semiconductor substrate (e.g., a common silicon image sensor integrated circuit die). The image sensors may be identical to each other or there may be different types of image sensors in a given image sensor array integrated circuit. One or more of the image sensors may be a Video Graphics Array (VGA) sensor with a resolution of 480×640 sensor pixels (as an example). If desired, images sensors with greater than VGA resolution (e.g., high-definition image sensors) or less than VGA resolution may be used.

If desired, one or more image sensors 16 in image sensor array 16A may be monochromatic. For example, image sensor array 16A may include a red image sensor having an array of red imaging pixels, a green image sensor having an array of green imaging pixels, and a blue image sensor having an array of blue imaging pixels. As additional examples, one or more image sensors 16 may include a color filter array having a Bayer pattern, one or more image sensors 16 may include one or more infrared imaging pixels, or one or more image sensors 16 may include pixel arrays that are formed exclusively with infrared imaging pixels (as examples). In general, image sensors 16 may include imaging pixels having any suitable spectral sensitivity.

During image capture operations, light from a scene may be focused onto image sensor array 16A using one or more lenses 14. Image sensor 16 may provide corresponding digital image data to processing circuitry 18.

Processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18. Processed image data may, if desired, be provided to external equipment (e.g., a computer or other device) using wired and/or wireless communications paths coupled to processing circuitry 18.

Figure 2:
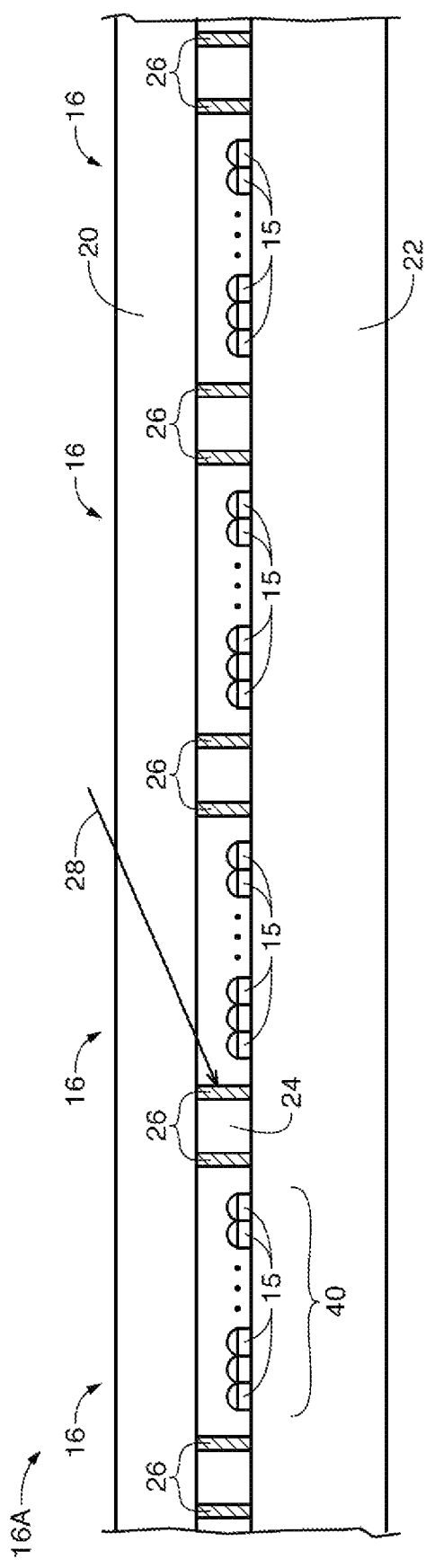
FIG. 2 is a cross-sectional side view of an illustrative array of image sensors having a semiconductor substrate and a cover layer attached using adhesive, where the outer surfaces of the adhesive are coated with a light blocking material in accordance with an embodiment of the present invention.

FIG. 2 shows an illustrative image sensor array 16A having an array of image sensors 16 (e.g., a 4×4 array of image sensors 16, a 4×3 array of image sensors 16, a 1×3 array of image sensors 16, etc.). Each image sensor 16 may include an image pixel array 40 having an array of image sensor pixels 15. Image pixel arrays 40 may each include an array of photosensitive elements such as photodiodes formed in a substrate such as image sensor substrate 22. A color filter array may be formed over the array of photodiodes and a microlens array may be formed over the color filter array of each pixel array 40. Substrate 22 may include a semiconductor substrate (e.g., an epitaxial silicon layer) in which the photodiodes are formed and a dielectric layer (e.g., an oxide layer) in which metal interconnect circuitry is formed (sometimes referred to as an interlayer dielectric (ILD), an intermetal dielectric layer, an intermetal dielectric stack, or an interconnect stack).

Image sensors 16 may be backside illumination image sensors or may be front side illumination image sensors. In a front side illumination image sensor, circuitry such as metal interconnect circuitry may be interposed between the microlens array and the photosensitive regions of the image sensor. In a backside illumination image sensor, the photosensitive regions are interposed between the microlens array and the metal interconnect circuitry of the image sensor.

A protective cover layer such as transparent protective cover layer 20 may cover image sensors 16. Cover layer 20 may be formed from a transparent glass sheet, a clear plastic layer, or other suitable transparent member. Cover layer 20 may be attached to image sensor substrate 22 using an adhesive such as adhesive 24. Adhesive 24 may, for example, be a photodefinable adhesive such as a dry film adhesive that can be applied and patterned using photolithographic techniques. Prior to attaching cover layer 20, adhesive 24 may be laminated or otherwise applied over image sensors 16 and then patterned to remove portions of the adhesive that cover pixel arrays 40. As shown in FIG. 2, portions of adhesive 24 that are located between adjacent image sensors 16 remain on substrate 22 after patterning. Because adhesive 24 has a grid-like shape and surrounds (or partially surrounds) individual pixel arrays 40, adhesive 24 is sometimes referred to herein as an adhesive wall or an adhesive grid. After forming adhesive grid 24, cover layer 20 may be attached to substrate 22 and adhesive grid 24 may be cured to bond cover layer 20 to substrate 22.

To minimize optical crosstalk between image sensors 16, light barriers may be formed between image sensors 16. For example, a light blocking material such as light blocking material 26 may be interposed between adjacent image sensors 16. In the example of FIG. 2, light blocking material 26 is coated on the outer surfaces of adhesive walls 24. Light blocking material 26 may be formed from an organic substance (e.g., a polymer such as polyimide containing a dye or pigment such as carbon black or other substance that renders light blocking material 26 opaque to visible light) or may be formed from an inorganic substance such as chromium oxide that has a black or dark color. If desired, light blocking material 26 may be formed from metal (e.g., tungsten or other suitable metal) that is deposited onto adhesive 24 (e.g., using chemical vapor deposition, physical vapor deposition, electroplating, etc.). Light blocking material 26 may be laminated, spin-coated, sprayed or otherwise applied over image sensors 16 and then patterned (e.g., photo-defined) to remove portions of light blocking material 26 that cover pixel arrays 40. In the example of FIG. 2, portions of light blocking material 26 line the outer surfaces of adhesive walls 24 after patterning.

If desired, light blocking material 26 may transmit certain ranges of wavelengths while blocking other ranges of wavelengths. For example, light blocking material 26 may transmit infrared light while blocking visible light, may transmit visible light while blocking infrared light, may transmit certain colors of visible light while blocking other colors of visible light, etc. In general, light blocking material 26 may be configured with any suitable spectral response.

The presence of light blocking material 26 may help minimize optical crosstalk between image sensors 16. For example, as shown in FIG. 2, light blocking material 26 may prevent incoming light 28 (e.g., a light ray having a high angle of incidence) from passing between adjacent image sensors 16. This in turn can help significantly improve system performance of the multi-array camera.

The example of FIG. 2 in which light blocking material 26 coats the outer surfaces of adhesive walls 24 is merely illustrative. If desired, light blocking material 26 may be formed within adhesive walls 24. This type of arrangement is shown in FIG. 3.

Figure 3:
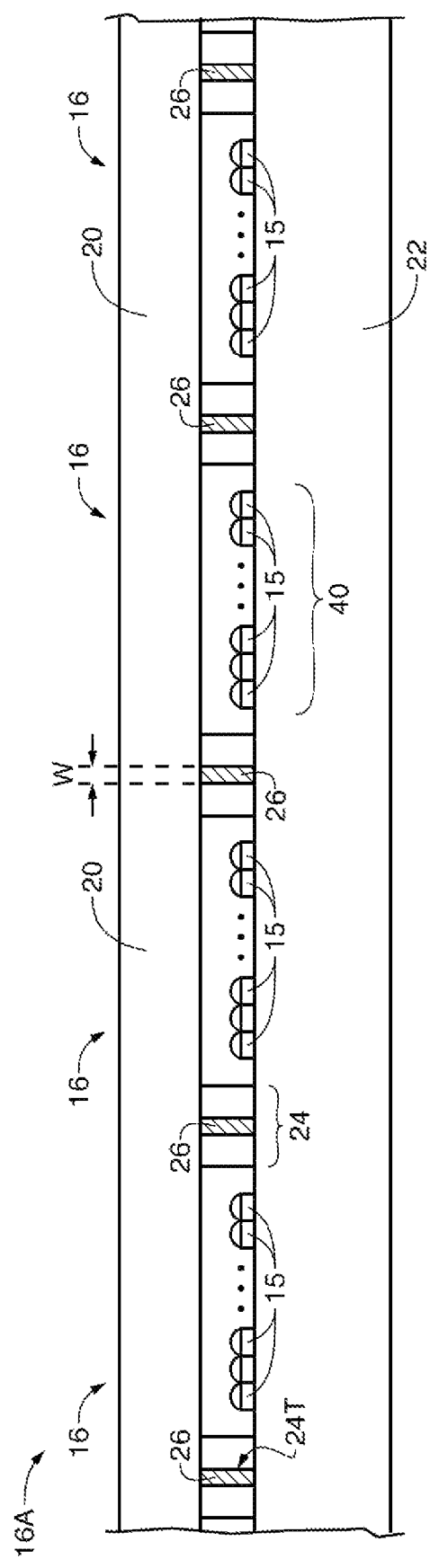
FIG. 3 is a cross-sectional side view of an illustrative array of image sensors having a semiconductor substrate and a cover layer attached using adhesive, where a trench in the adhesive is filled with a light blocking material in accordance with an embodiment of the present invention.

As shown in FIG. 3, adhesive walls 24 include trenches (sometimes referred to as openings, recesses, or cavities) such as trenches 24T. Trenches 24T may be formed in adhesive walls 24 using photolithography. For example, adhesive 24 may be laminated or otherwise applied over image sensors 16 and then patterned to remove portions of the adhesive that cover pixel arrays 40 and to remove portions of adhesive 24 to form trenches 24T in adhesive 24. In the example of FIG. 3, trenches 24T extend from a lower surface of adhesive wall 24 to an opposing upper surface of adhesive wall 24. This is, however, merely illustrative. If desired, trenches 24T may extend only partially through adhesive walls 24. Trenches 24T may have any suitable width so long as the desired bond strength of adhesive 24 is not compromised. Width W of trenches 24T may, for example, be 100 microns, 120 microns, 140 microns, more than 150 microns, less than 150 microns, etc. Trenches 24T need not be present in every portion of adhesive 24. If desired, trenches 24T may be selectively formed in adhesive 24T such that some portions are solid and contiguous (e.g., free of openings) while other portions are provided with trenches 24T.

After depositing and patterning adhesive to form adhesive walls 24 with trenches 24T, light blocking material 26 may be deposited in openings 24T. For example, in arrangements where light blocking material 26 is a photodefinable, partially opaque film, light blocking material 26 may be laminated or otherwise applied over image sensors 16 and in trenches 24T and then patterned to remove portions of light blocking material 26 covering pixel arrays 40. In the example of FIG. 3, portions of light blocking material 26 completely fill trenches 24T in adhesive walls 24 after patterning. If desired, light blocking material 26 may only partially fill trenches 24T. The example of FIG. 3 in which light blocking material 26 completely fills trenches 24T is merely illustrative.

If desired, crosstalk reduction structures may also be formed in cover layer 20. For example, cover layer 20 may have openings, trenches, or cavities between adjacent image sensors 16 that may be filled with a light blocking material to reduce crosstalk between image sensors. This type of arrangement is illustrated in FIG. 4.

As shown in FIG. 4, cover layer 20 includes light barrier structures 26B interposed between adjacent image sensors 16. Light barrier structures 26B may be formed from the same material that forms light blocking material 26A on adhesive grid 24 or may be formed from a different opaque material. Light blocking material 26 may, for example, be located within openings such as openings 20T in cover layer 20. Openings 20T may be formed directly over adhesive walls 24. In the example of FIG. 4, openings 20T extend from an upper surface of cover layer 20 to an opposing lower surface of cover layer 20 and are completely filled with light blocking material 26B. This is, however, merely illustrative. If desired, openings 20T in cover layer 20 may extend only partially through cover layer 20 and/or openings 20T may be only partially filled with light blocking material 26B.

Openings 20T may be formed in cover layer 20 by etching, laser cutting, water jet cutting, or any other suitable technique. Openings 20T may be etched and filled with light blocking material 26B prior to attaching cover layer 20 to image sensor substrate 22, may be etched and filled with light blocking material 26B after attaching cover layer 20 to image sensor substrate 22, or may be etched prior to attaching cover layer 20 to image sensor 22 and then subsequently filled with light blocking material 26B.

The presence of light blocking material 26B in cover layer 20 may help minimize optical crosstalk between image sensors 16. For example, as shown in FIG. 4, light blocking material 26B may prevent incoming light 28 (e.g., a light ray having a high angle of incidence) from passing between adjacent image sensors 16. This in turn can help significantly improve system performance of the multi-array camera.

In addition to forming light barriers 26B in cover layer 20, adhesive 24 may also be lined with a light blocking material such as light blocking material 26A. As in the example of FIG. 2, light blocking material 26A of FIG. 4 coats the outer surfaces of adhesive walls 24. With this type of arrangement, light blocking material 26A on adhesive 24 and light blocking material 26B in cover layer 20 do not directly overlap (e.g., barriers 26A are laterally offset from barriers 26B). This is, however, merely illustrative. If desired, light barrier structures 26B of cover layer 20 may directly overlap light barrier structures 26A on adhesive 24. This type of arrangement is shown in FIG. 5.

As in the example of FIG. 3, light blocking material 26A of FIG. 5 may be formed in trenches 26T in adhesive walls 24. With this type of arrangement, light blocking material 26A and light blocking material 26B may form a continuous light barrier that extends from an upper surface of image sensor substrate 22 to an upper surface of cover layer 20. Light blocking material 26A and light blocking material 26B may have the same width (as shown in the schematic of FIG. 5) or may have different widths. If desired, light blocking material 26A and light blocking material 26B may only partially fill openings 24T and 20T, respectively. The example of FIG. 5 is merely illustrative.

If desired, light blocking material 26A and light blocking material 26B may serve as alignment marks for aligning cover layer 20 to image sensor substrate 22. For example, light blocking material 26A and 26B may each form a grid of crisscrossing horizontal and vertical lines in between image sensors 16 of array 16A (e.g., a grid of horizontal lines parallel to the x-axis of FIG. 5 and vertical lines parallel to the y-axis of FIG. 5). The intersection of the vertical and horizontal lines formed by material 26A maybe aligned with the intersection of the vertical and horizontal lines formed by material 26B to accurately align cover layer 20 to image sensor substrate 22 when cover layer 20 is being attached to image sensor substrate 22.

If desired, light blocking material 26 may only be formed in cover layer 20 or may only be formed on adhesive 24. The examples of FIGS. 3, 4, 5, and 6 are merely illustrative.

FIGS. 6-11 show illustrative examples of how light blocking material 26 can be formed on or in adhesive 24.

Figure 6:
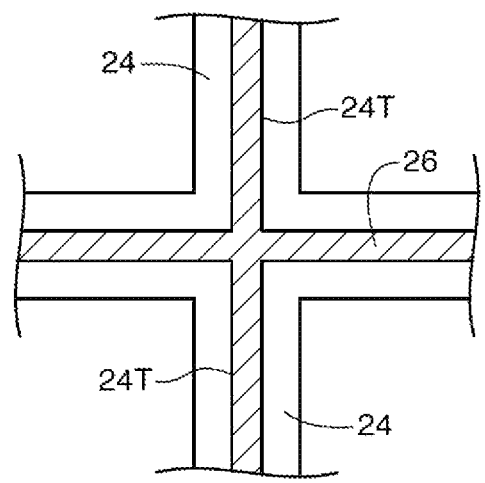
FIG. 6 is a top view of an illustrative adhesive grid having a trench filled with a light blocking material in accordance with an embodiment of the present invention.

In the example of FIG. 6, light blocking material 26 fills trench 24T in adhesive 24. Light blocking material 26 may completely fill trench 24T (e.g., may extend from the bottom of trench 24T to the top of trench 24T) or may only partially fill trench 24T (e.g., may not extend all the way to the top of trench 24T).

Figure 7:
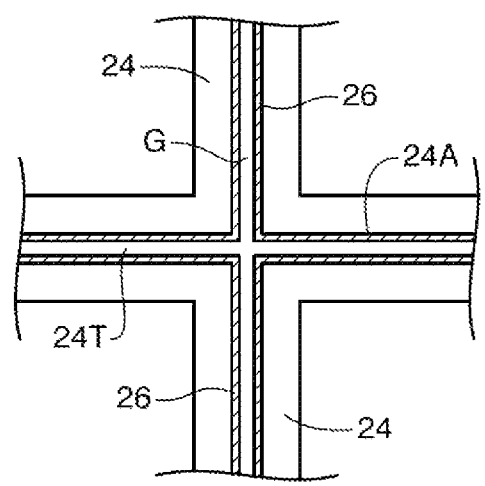
FIG. 7 is a top view of an illustrative adhesive grid having a trench partially filled with a light blocking material in accordance with an embodiment of the present invention.

In the example of FIG. 7, inner surfaces 24A of adhesive 24 that define trench 24T may be coated with a layer of light blocking material 26. With this type of arrangement, light blocking material only partially fills trench 24T such that a gap G is present between opposing inner surfaces 24A that define trench 24T in adhesive 24. Gap G may be filled with air, may be filled with additional adhesive 24, or may be filled with a second light blocking material (e.g., a layer of metal, an opaque polymer substance, or other material).

Figure 8:
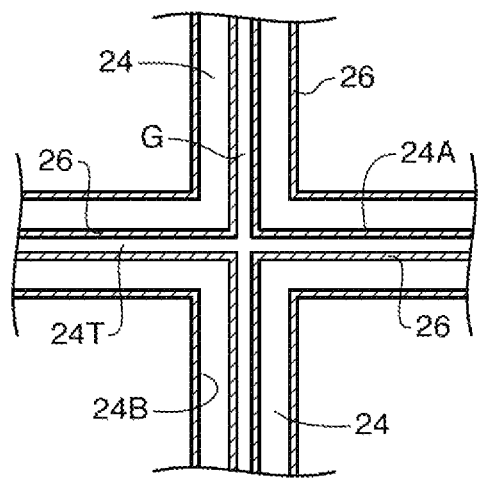
FIG. 8 is a top view of an illustrative adhesive grid having a trench partially filled with a light blocking material and having outer surfaces that are coated with a light blocking material in accordance with an embodiment of the present invention.

In the example of FIG. 8, both inner surfaces 24A that define trench 24T and outer surfaces 24B of adhesive 24 are coated with a layer of light blocking material 26. A gap G may be present between opposing inner surfaces 24A that define trench 24T in adhesive 24. Gap G may be filled with air, may be filled with additional adhesive 24, or may be filled with a second light blocking material (e.g., a layer of metal, an opaque polymer substance, or other material).

Figure 9:
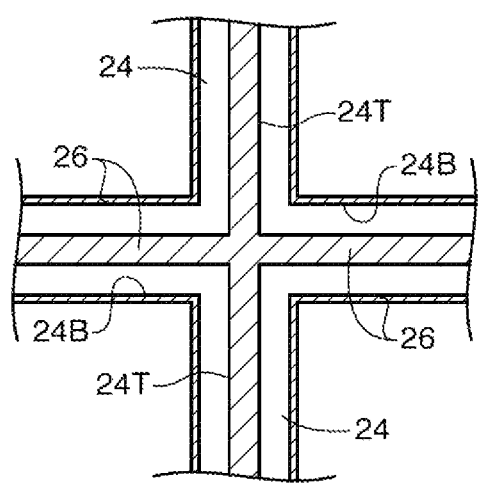
FIG. 9 is a top view of an illustrative adhesive grid having a trench filled with a light blocking material and having outer surfaces that are coated with a light blocking material in accordance with an embodiment of the present invention.

In the example of FIG. 9, trench 24T in adhesive 24 is filled with light blocking material 26 and outer side surfaces 24B are coated with a layer of light blocking material 26. Light blocking material 26 may completely fill trench 24T (e.g., may extend from the bottom of trench 24T to the top of trench 24T) or may only partially fill trench 24T (e.g., may not extend all the way to the top of trench 24T).

Figure 10:
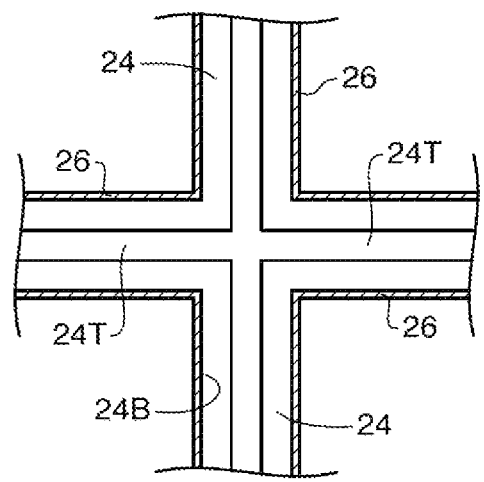
FIG. 10 is a top view of an illustrative adhesive grid having a trench and having outer surfaces that are coated with a light blocking material in accordance with an embodiment of the present invention.

In the example of FIG. 10, trench 24T is free of light blocking material 26, while outer side surfaces 24B are coated with a layer of light blocking material 26. Trench 24T may be filled with air, may be filled with additional adhesive 24, or may be filled with a second light blocking material (e.g., a layer of metal, an opaque polymer substance, or other material).

Figure 11:
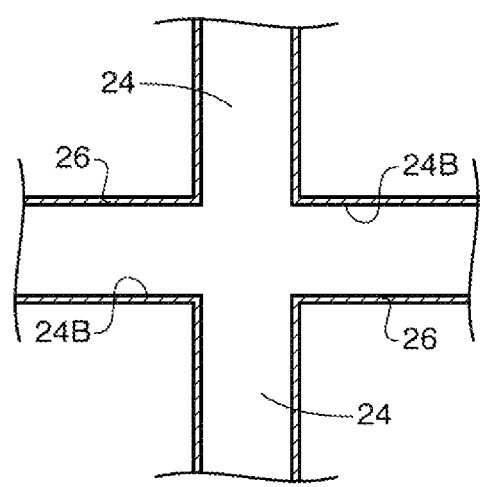
FIG. 11 is a top view of an illustrative adhesive grid having outer surfaces that are coated with a light blocking material in accordance with an embodiment of the present invention.

In the example of FIG. 11, adhesive 24 does not include any openings or trenches and instead forms a solid contiguous adhesive wall between adjacent image sensors. Outer surfaces 24B of adhesive 24 may be coated with light blocking material 26.

Various embodiments have been described illustrating an electronic device that includes an imaging system. An imaging system such as an array camera may include an array of image sensors. Each image sensor in the array may include an array of image pixels formed in a semiconductor substrate. For example, multiple arrays of image pixels may be formed in a common image sensor substrate. Each image pixel may include one or more photosensitive elements configured to convert incoming light into electric charges.

A transparent cover layer such as a protective glass cover layer may be provided over the image sensor array and may be attached to the image sensor substrate using an adhesive.

Prior to attaching the cover layer to the image sensor substrate, the adhesive may be applied over the image sensors and patterned using photolithography to remove portions of the adhesive over the image pixel arrays. The adhesive that remains on the image sensor substrate may form walls between adjacent image sensors. For example, in an array camera having a two-dimensional array of image sensors, the remaining adhesive on the image sensor substrate may have a grid-like shape with crisscrossing lines of adhesive interposed between adjacent image sensors. In some embodiments, the adhesive that remains on the image sensor substrate after patterning may include one or more trenches. In other embodiments, the adhesive may be solid and contiguous throughout the adhesive grid.

To minimize crosstalk between adjacent image sensors in the array, a light blocking material may be formed on the adhesive grid. The light blocking material may fill or partially fill a trench in the adhesive, may coat the outer surfaces of the adhesive, and/or may coat the inner surfaces of the adhesive. The light blocking material may be formed from a partially opaque photodefinable material that is deposited and patterned to form light barriers in between adjacent image sensors.

After forming the adhesive grid and the light barriers, the cover layer may be attached to the image sensor substrate and the adhesive may be cured to bond the cover layer to the image sensor substrate.

If desired, light barriers may also be formed in the cover layer. For example, trenches or openings may be etched in the cover layer and filled with a light blocking material. The trenches may be formed between adjacent image sensors in the array (e.g., aligned with or overlapping the adhesive grid on the image sensor substrate). In arrangements where light barriers are formed in both the cover layer and the adhesive layer on the image sensor substrate, the light barriers may be used as alignment marks for aligning the cover layer to the image sensor substrate when the cover layer is being attached to the image sensor substrate.

The foregoing is merely illustrative of the principles of this invention and various modifications can be made by those skilled in the art. The foregoing embodiments may be implemented individually or in any combination.

What is claimed is:

1. An imaging system, comprising:
   an array of image sensors formed in an image sensor substrate, wherein each image sensor includes an array of image sensor pixels;
   a transparent cover layer formed over the array of image sensors;
   an adhesive interposed between the image sensor substrate and the transparent cover layer, wherein the adhesive attaches the transparent cover layer to the image sensor substrate; and
   a light blocking material formed on the adhesive, wherein the light blocking material is interposed between adjacent image sensors in the array of image sensors.

2. The imaging system defined in claim 1 wherein the adhesive comprises a trench and wherein the light blocking material is located in the trench.

3. The imaging system defined in claim 2 wherein the light blocking material completely fills the trench.

4. The imaging system defined in claim 2 wherein the adhesive has inner surfaces that define the trench and wherein the inner surfaces are coated with the light blocking material.

5. The imaging system defined in claim 1 wherein the adhesive forms a wall between the adjacent image sensors in the array of image sensors, wherein the wall has first and second opposing outer surfaces, and wherein the first and second opposing outer surfaces are coated with the light blocking material.

6. The imaging system defined in claim 5 wherein the adhesive comprises a trench and wherein the light blocking material is located in the trench.

7. The imaging system defined in claim 6 wherein the light blocking material completely fills the trench.

8. The imaging system defined in claim 6 wherein the adhesive has inner surfaces that define the trench and wherein the inner surfaces are coated with the light blocking material.

9. The imaging system defined in claim 1 wherein the light blocking material comprises an opaque polymer.

10. The imaging system defined in claim 1 wherein the light blocking material transmits light corresponding to a first range of wavelengths and blocks light corresponding to a second range of wavelengths.

11. An imaging system, comprising:
    an array of image sensors formed in an image sensor substrate, wherein each image sensor includes an array of image sensor pixels;
    a transparent cover layer formed over the array of image sensors, wherein the transparent cover layer comprises at least one opening and wherein the opening is interposed between an adjacent pair of image sensors in the array of image sensors;
    an adhesive interposed between the image sensor substrate and the transparent cover layer, wherein the adhesive attaches the transparent cover layer to the image sensor substrate; and a light blocking material formed in the at least one opening in the transparent cover layer.

12. The imaging system defined in claim 11 wherein the transparent cover layer comprises glass and wherein the at least one opening is etched in the glass.

13. The imaging system defined in claim 12 wherein the at least one opening extends from an upper surface of the glass to a lower surface of the glass and wherein the light blocking material fills the opening.

14. The imaging system defined in claim 12 wherein the at least one opening extends only partially through the glass.

15. The imaging system defined in claim 11 wherein the light blocking material comprises black pigment.

16. An imaging system, comprising:
    an array of image sensors formed in an image sensor substrate, wherein each image sensor includes an array of image sensor pixels;
    a glass cover layer formed over the array of image sensors, wherein the glass cover layer comprises at least one opening and wherein the opening is interposed between an adjacent pair of image sensors in the array of image sensors;
    an adhesive interposed between the image sensor substrate and the glass cover layer, wherein the adhesive attaches the glass cover layer to the image sensor substrate; and
    a first opaque material formed in the at least one opening in the glass cover layer and a second opaque material formed on the adhesive, wherein the first and second opaque materials are interposed between the adjacent pair of image sensors in the array of image sensors.

17. The imaging system defined in claim 16 wherein the first and second opaque materials form respective first and second alignment marks, wherein the glass cover layer is aligned with respect to the image sensor substrate using the first and second alignment marks.

18. The imaging system defined in claim 16 wherein the adhesive comprises a trench and wherein the second opaque material is located in the trench.

19. The imaging system defined in claim 16 wherein the adhesive comprises a dry film adhesive.

20. The imaging system defined in claim 16 wherein the first and second opaque materials comprise black pigment that blocks visible light.

* * * * *